United States Patent [19]
Cooper

[11] 3,862,164
[45] Jan. 21, 1975

[54] THIAZOLIDINE AZETIDINONES
[75] Inventor: Robin D. G. Cooper, Indianapolis, Ind.
[73] Assignee: Eli Lilly and Company, Indianapolis, Ind.
[22] Filed: Feb. 3, 1971
[21] Appl. No.: 112,389

[52] U.S. Cl.... 260/306.7 C, 260/239.1, 260/243 C, 260/306.7 E
[51] Int. Cl............................................ C07d 99/10
[58] Field of Search.................. 260/306.7, 306.7 C

[56] References Cited
UNITED STATES PATENTS
3,522,266  7/1970  Woodward...................... 260/306.7

Primary Examiner—Richard J. Gallagher
Attorney, Agent, or Firm—Leroy Whitaker; Everet F. Smith

[57] ABSTRACT

Novel 2-substituted thiazoline azetidinones are obtained from 2,6-disubstituted thiazoline azetidinones by ozonolysis and solvolysis. Reduction of the 2-substituted thiazoline azetidinones by treatment with aluminum amalgam or sodium borohydride leads to the corresponding thiazolidine azethidinones. The latter class of compounds are useful in the synthesis of penicillins and cephalosporins.

5 Claims, No Drawings

THIAZOLIDINE AZETIDINONES

BACKGROUND OF THE INVENTION

Following the discovery of the strong antibiotic activity of the cephalosporin compounds, much effort has been devoted to the synthesis of members of this family. Some synthetic approaches by Woodward and co-workers are described in British Pat. Nos. 1,155,017 through 1,155,030 and German Offenlegungsschrift Nos. 1,935,459 1,935,638, and 1,935,970. Syntheses by Sheehan are described in U.S. Pat. Nos. 3,487,070 through 3,487,072, 3,487,074, 3,487,079, and 3,487,090.

Of particular interest are U.S. Pat. No. 3,487,074 which describes the synthesis of penicillin and cephalosporin compounds by the reaction of azetidinones with selected esters and British Pat. No. 1,155,024 which describes the preparation of 7-acylaminocephalosporanic acids from thiazolidine azetidinones. The various steps involved in the synthesis of the thiazolidine azetidinones and their conversion to cephalosporanic acids are claimed in the above-named British patents.

SUMMARY

I have now discovered a class of thiazolidine azetidinones which are useful in the synthesis of penicillins and cephalosporins by the methods described in U.S. Pat. No. 3,487,074, and British Pat. No. 1,155,024. These thiazolidine azetidinones have the structure

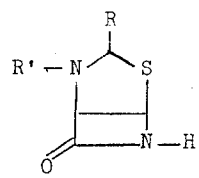

They are prepared from 2,6-disubstituted thiazoline azetidinones by a multi-step process comprising: (A) treating with ozone at $-80°$ to $-20°$ C.; (B) after ozonolysis, treating with a $C_1$-$C_3$ alkanol; (C) reducing the double bond of the thiazoline ring by treatment with aluminum amalgam or sodium borohydride; and (D) after reduction of the double bond, optionally treating with an agent which will replace the hydrogen attached to the nitrogen of the thiazolidine ring with

trimethylsilyl, trichloroethoxycarbonyl, t-butoxycarbonyl, or benzyloxycarbonyl. The order of these steps may be varied within defined limits. The thiazoline azetidinone starting material is obtained by the rearrangement of a penicillin sulfoxide.

DESCRIPTION OF THE PREFERRED EMBODIMENT

The thiazolidine azetidinones of my invention are those having the following formula

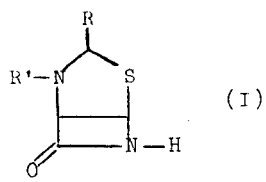

wherein R is hydrogen;

$C_1$-$C_4$ alkoxy;

carboethoxy;

$C_1$-$C_8$ alkyl, optionally substituted with hydroxy, mercapto, $C_1$-$C_3$ alkoxy, $C_1$-$C_3$ alkylthio, or cyano;

$C_2$-$C_8$ alkenyl, optionally substituted with hydroxy, mercapto, $C_1$-$C_3$ alkoxy, $C_1$-$C_3$ alkylthio, or cyano;

$C_3$-$C_8$ cycloalkyl, optionally substituted with hydroxy, mercapto, $C_1$-$C_3$ alkoxy, $C_1$-$C_3$ alkylthio, or cyano;

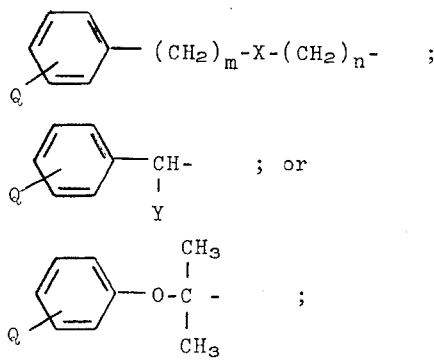

Q is hydrogen, hydroxy, mercapto, chloro, bromo, $C_1$-$C_3$ alkyl, $C_1$-$C_3$ alkoxy, $C_1$-$C_3$ alkylthio, nitro, or cyano;

X is oxygen, sulfur, or a carbon to carbon bond;

Y is hydroxy, mercapto, azido, or amino;

m is an integer of 0 to 2;

n is an integer of 1 to 2; and

R' is hydrogen,

trimethylsilyl, trichloroethoxycarbonyl, t-butoxycarbonyl, or benzyloxycarbonyl.

As will be seen below from the description of the method of preparation of these thiazolidine azetidinones, the R group in the molecule is a function of the penicillin starting material. In the preparation of these compounds from penicillins, the carbonyl carbon atom and the nitrogen atom of the carboxamido group in the 6-position of the penicillin become a part of the thiazolidine ring. R is the residue of this carboxamido group. Thus, R may be derived from any carboxamido group which may be present in the penicillin molecule.

Literally hundreds of such carboxamido groups are known in the prior art. Many are described for example, in U.S. Pat. Nos. 2,941,995, 2,951,839, 2,985,648, 2,996,501, 3,007,920, 3,025,290, 3,028,379, 3,035,047, 3,040,032, 3,040,033, 3,041,332, 3,041,333, 3,043,831, 3,053,831, 3,071,575, 3,071,576, 3,079,305, 3,079,306, 3,080,356, 3,082,204, 3,093,547, 3,093,633, 3,116,285, 3,117,119, 3,118,877, 3,120,512, 3,120,513, 3,120,514, 3,127,394, 3,140,282, 3,142,673, 3,147,247, 3,174,964, 3,180,863, 3,198,804, 3,202,653, 3,202,654, 3,202,655, 3,210,337, 3,157,639, 3,134,767, and 3,132,136. The groups described in the above formula are merely representative of the entire class of such carboxamido groups and equivalent carboxamido groups are well known to those skilled in the art.

Representative of the R groups described in the formula are methyl, ethyl, octyl, hydroxyethyl, 3-methoxypropyl, cyanomethyl, vinyl, allyl, hexen-2-yl, propynyl, pentyn-3-yl, benzyl α-hydroxybenzyl, α-aminobenzyl, α-azidobenzyl, phenoxymethyl, benzyloxyethyl, α-amino-m-nitrobenzyl, p-methoxyphenylthiomethyl, and p-chlorobenzyl.

R' in the thiazolidine azetidinone as originally obtained from the penicillin is hydrogen. However, this hydrogen may be substituted by an acyl group such as those normally used to acylate the 6-amino group of penicillins or the hydrogen may be substituted by any of the well known amine blocking groups. As will be described in more detail below, the R' group is present as the substituent on the 6-amino group of penicillins or 7-amino group of cephalosporins prepared from the thiazolidine azetidinone.

It is understood that Y may be a protected hydroxy, mercapto, or amino group as well as the free group. The protection of such groups is well known to those skilled in organic chemistry. The hydroxy group is generally protected by conversion to an easily cleaved ester, such as the formate or acetate. A number of amino-protecting groups are widely used. Representative of such groups are trimethylsilyl, trichloroethoxycarbonyl, benzyloxycarbonyl, and t-butoxycarbonyl.

The first step in obtaining a 2-substituted thiazolidine azetidinone from a penicillin involves the rearrangement of the penicillin to a 2,6-disubstituted thiazoline azetidinone having the formula

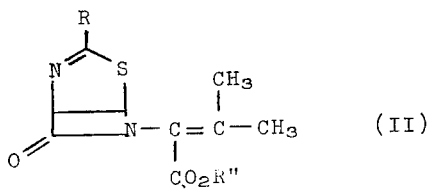

(II)

wherein R is as defined above and

R'' is $C_1$-$C_6$ alkyl, $C_4$-$C_6$ t-alkyl, $C_5$-$C_8$ t-alkenyl, $C_5$-$C_8$ t-alkynyl, benzyl, benzhydryl, trityl, p-nitrobenzyl, p-methoxybenzyl, trimethylsilyl, phthalimidomethyl, succinimidomethyl, or trichloroethyl.

The function of R'' is to protect the carboxyl group during the reactions involved. Therefore, the exact nature of R'' is unimportant. Any ester group can be used and the classes recited above are merely illustrative. Further, the side chain containing this ester group is lost during subsequent reactions.

The rearrangement of a penicillin to the 2,6-disubstituted thiazoline azetidinone shown above is not a part of the present invention. However, for completeness, the method for performing this rearrangement will be described. The rearrangement is a simple one and involves the treatment of a penicillin sulfoxide having the formula

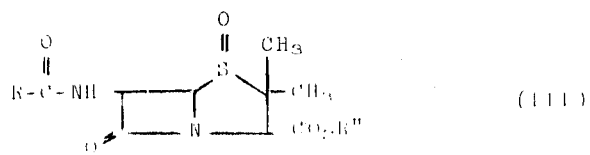

(III)

wherein R and R'' are as defined above, with at least one equivalent of triphenyl phosphine or a trialkyl phosphite at a temperature of 40° to 125° C., followed by treatment with a base to bring about a shift of the side-chain double bond. The alkyl groups of the trialkyl phosphite should contain from one to four carbon atoms. This process will be illustrated in the examples.

When R in III is

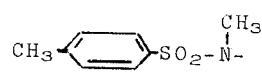

the rearrangement to the thiazoline azetidinone is accompanied by loss of the p-toluenesulfonamido group. Two products are obtained from this reaction. They have been identified as

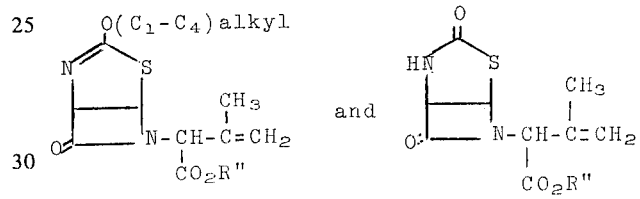

The side chain double bond is shifted from the β,γ- to α,β-position by treatment with a base such as triethylamine. When these compounds are subjected to the process described herein the following products are obtained:

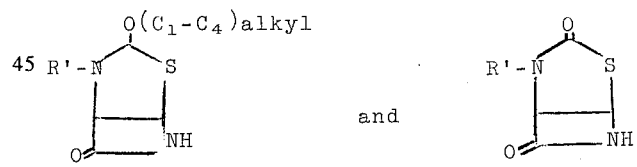

wherein R' is as defined above. The $C_1$-$C_4$ alkyl group attached to the oxygen comes from the trialkyl phosphite used in the penicillin rearrangement. This alkyl group is preferably methyl.

In the process of this invention a 2,6-disubstituted thiazoline azetidinone of formula II is subjected to a series of four steps: (A) ozonolysis; (B) after ozonolysis, solvolysis; (C) reduction of the carbon to nitrogen double bond of the ring; and (D) optionally, after reduction, acylation of the thiazolidine nitrogen. The particular order of these steps is unimportant except that the solvolysis step must come after the ozonolysis and the acylation must come after the reduction. The various possible paths that the process can take are illustrated by the following schematic equations.

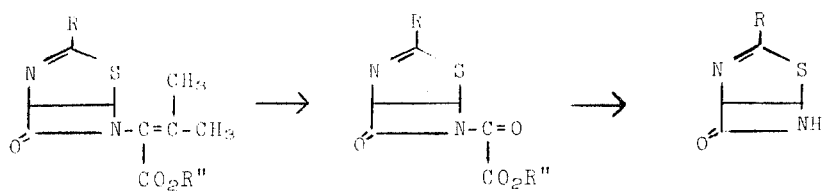

(II)   (IX)   (IV)

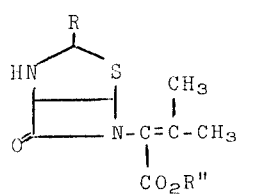

(X)   (V)

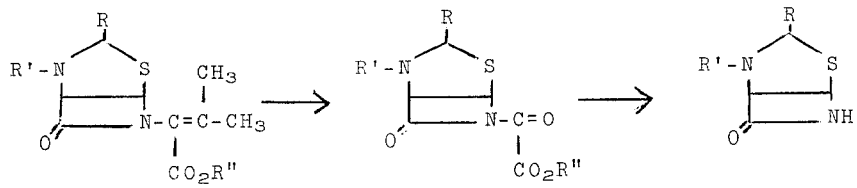

(XI)   (VI)   (I)

Ozonolysis results in attack of the carbon to carbon double bond of the 6-substituent with formation of an imide. This may be the first step in the process or may follow reduction of the thiazoline double bond and acylation of the thiazolidine nitrogen. The ozonolysis is conducted by treating with ozone at −80° to −20° C., preferably at −80° to −50° C. An inert solvent such as methylene chloride may be employed. Ozone is simply bubbled into the solution until the reaction is complete as indicated by the formation of a blue color. The ozonide is then reduced in accordance with known procedures to obtain the carbonyl group. As used herein this term "ozonolysis" is intended to include this reduction.

The product from ozonolysis is treated with a lower alkanol containing from one to three carbon atoms to complete the removal of the 6-substituent. The solvolysis is conducted at a temperature of 0° to +80° C. The reaction occurs readily upon the addition of a $C_1$–$C_3$ alkanol to the ozonolysis product. The solvolysis is aided by the presence of a base such as sodium methoxide, sodium hydroxide, potassium carbonate, or triethylamine. Methanol is preferred for this solvolysis reaction.

The ozonolysis and solvolysis steps may be combined into a single operation by using $C_1$–$C_3$ alkanol as solvent for the ozonolysis. The ozonolysis product spontaneously undergoes solvolysis.

Reduction of the double bond of the thiazoline ring is accomplished by treatment with aluminum amalgam or sodium borohydride at a temperature of 0° to 50° C. The reaction is conducted in moist ether solvents following known procedures for aluminum amalgam or sodium borohydride reductions. Typical solvents include diethyl ether, tetrahydrofuran, and dioxane. The reduction may be conducted before or after ozonolysis and solvolysis.

This reduction results in a thiazolidine containing hydrogen attached to the nitrogen of the ring. This hydrogen may be replaced with other groups just as in the case of other secondary amines. Throughout this specification I refer to this replacement broadly as "acylation" of the nitrogen. Actually, I intend to include any substitution on the nitrogen. The term "acylation" is used for convenience and because the most common reactions involved are acylations.

Of primary interest is the substitution on the nitrogen with an acyl group of the type used to acylate the 6-amino group of penicillins. Also of interest is the protection of the nitrogen with commonly used amine protecting groups such as trimethylsilyl, trichloroethoxycarbonyl, t-butoxycarbonyl, or benzyloxycarbonyl. Thus, it may be said that the thiazolidine is treated with an agent that replaces the hydrogen attached to the nitrogen of the thiazolidine ring with

trimethylsilyl, trichloroethoxycarbonyl, t-butoxycarbonyl, or benzyloxycarbonyl.

Such replacement reactions are well known to those skilled in the art. They involve treatment at 0° to 50° C. with a reagent such as an acid halide or acid anhydride having the formula

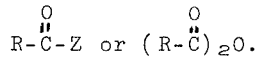

Acid chlorides are generally preferred. Acid halides are generally used under the conditions of the Schotten-Baumann reaction. Acylation reactions are also widely performed using the dicyclohexylcarbodiimide or mixed anhydride techniques. Introduction of the trichloroethoxycarbonyl, t-butoxycarbonyl, and benzyloxycarbonyl groups is accomplished by use of the corresponding chloroformates.

The thiazolidine azetidinones of this invention may be converted to penicillin and cephalosporin antibiotics according to the procedure described in U.S. Pat. No. 3,487,074. My thiazolidine azetidinones are substituted for the azetidinones of the patent. This conversion to penicillins and cephalosporins is depicted by the following equations.

Cephalosporins may also be obtained in accordance with the process of British Pat. No. 1,155,024 as shown by the following equations.

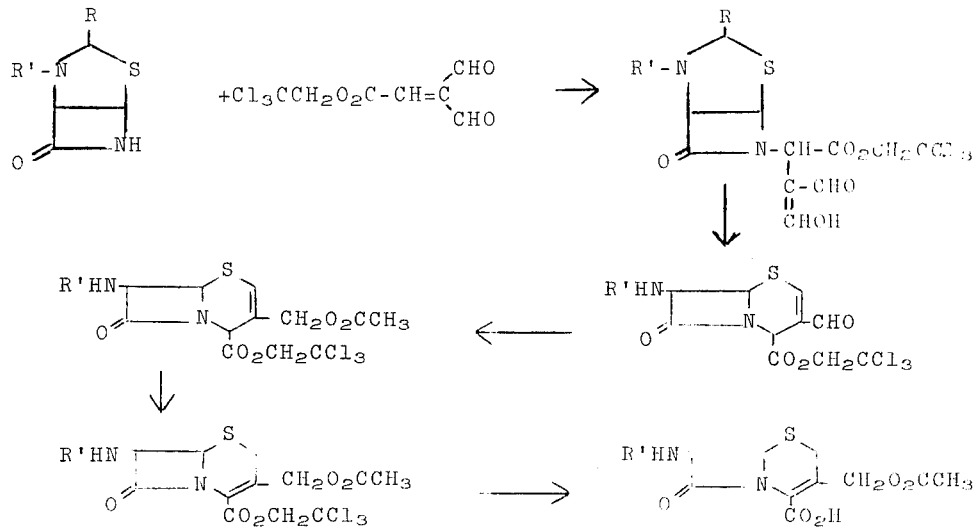

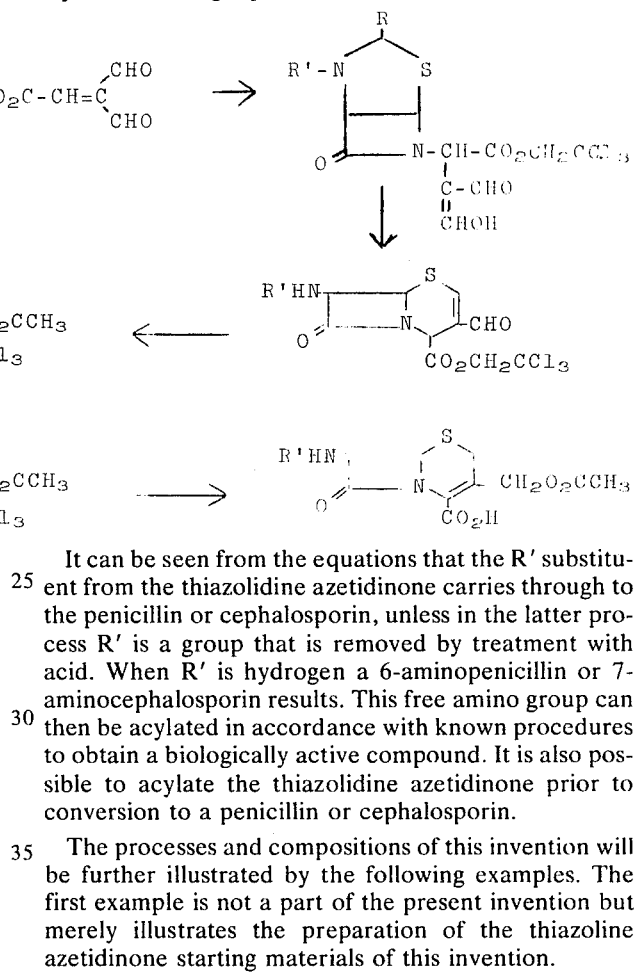

It can be seen from the equations that the R' substituent from the thiazolidine azetidinone carries through to the penicillin or cephalosporin, unless in the latter process R' is a group that is removed by treatment with acid. When R' is hydrogen a 6-aminopenicillin or 7-aminocephalosporin results. This free amino group can then be acylated in accordance with known procedures to obtain a biologically active compound. It is also possible to acylate the thiazolidine azetidinone prior to conversion to a penicillin or cephalosporin.

The processes and compositions of this invention will be further illustrated by the following examples. The first example is not a part of the present invention but merely illustrates the preparation of the thiazoline azetidinone starting materials of this invention.

EXAMPLE 1

A mixture of 1.36 g. of the trichloroethyl ester of penicillin G sulfoxide and 1 ml. of trimethyl phosphite in 50 ml. of benzene was heated under reflux for 36 hours. The solution was washed well with water, the solvent was removed under vacuum leaving a white solid which was recrystallized from methanol to give 985 mg. of white needles melting at 145° C. This prod-

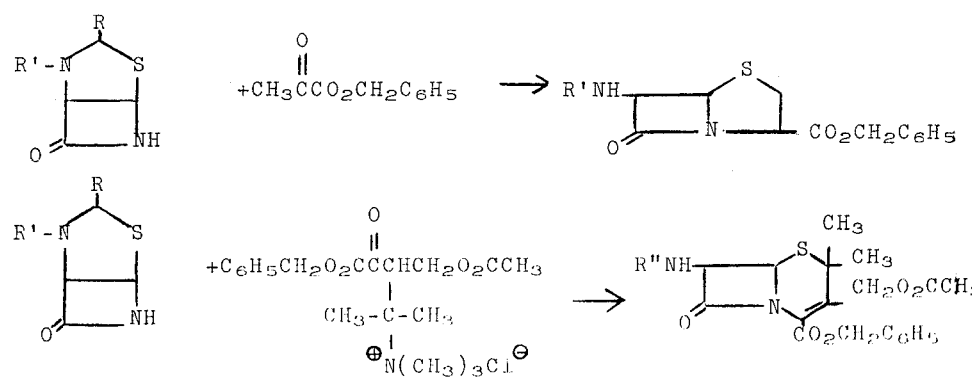

uct was confirmed by nuclear magnetic resonance spectroscopy to have the following structure.

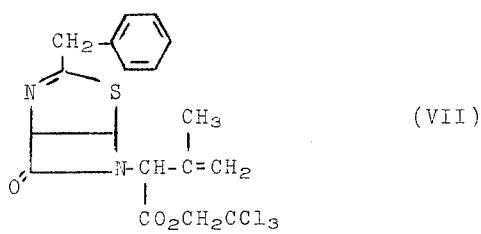

Analysis: Calculated for $C_{18}H_{17}N_2O_3Cl_3S$: C, 48.27; H, 3.83; N, 6.25; Cl, 23.75; S, 7.16.
Found: C, 48.51; H, 3.99; N, 6.48; Cl, 23.54; S, 7.30.

To shift the side chain double bond of compound VII to give a compound of formula II a solution of the above product in triethylamine was allowed to stand at room temperature for 5 minutes. The triethylamine was removed in vacuo leaving an oil. The infrared spectrum showed the presence of the β-lactam and ester groups while the nuclear magnetic resonance spectrum showed two methyl groups attached to a double bond, thus confirming the presence of a product of formula II wherein R is benzyl and R'' is trichloroethyl.

EXAMPLE 2

A solution of 5 g. of a thiazoline azetidinone of formula II wherein R is phenoxymethyl and R'' is trichloroethyl in 50 ml. of dry methylene chloride was cooled to −78° C. Ozone was bubbled through the solution until a blue color developed. The solution was poured into an aqueous sodium metabisulfite solution and extracted twice with 200 ml. portions of ether. The ether solution was dried over magnesium sulfate, filtered, and the solvent removed in vacuo to give a colorless oil which crystallized from ether as white crystals melting at 98° C. The yield was 2.48 g. A further 2.2 g. of the glyoxylate was obtained from the mother liquors.

EXAMPLE 3

A solution of 5 g. of compound II wherein R is phenoxymethyl and R'' is p-methoxybenzyl in 150 ml. of methylene chloride was cooled to −78° C. Ozone was bubbled through the solution until a blue color developed. Trimethyl phosphite (5 ml.) was added to the solution at −78° C. and the solution was allowed to come to room temperature with stirring over 30 minutes. The solvent was removed in vacuo and the residue was dissolved in 200 ml. of a 1:1 ether-ethyl acetate mixture. The solution was washed with water, dried over magnesium sulfate, filtered, and the solvent removed in vacuo to leave 4.6 g. of the glyoxylate as a white foam.

EXAMPLE 4

A solution of 470 mg. of the starting material used in Example 2 in 50 ml. of methanol was cooled to −78° C. and ozone was bubbled through the solution for 10 minutes until a blue color was obtained. The blue color was discharged by bubbling nitrogen through the solution. A solution of 200 mg. of trimethyl phosphite in 5 ml. of methylene chloride was added and the mixture was stirred while being allowed to warm to room temperature. The solution was evaporated in vacuo and the residue dissolved in ethyl acetate. The ethyl acetate solution was washed well with water, dried over magnesium sulfate, and evaporated in vacuo to leave 370 mg. of a white foam. Crystallization from methanol gave 72 mg. of a thiazoline azetidinone of formula IV wherein R is phenoxymethyl.

EXAMPLE 5

A solution of 1.43 g. of a thiazoline azetidinone of formula II (R=phenoxymethyl, R''=methyl) in 50 ml. of tetrahydrofuran containing 1 ml. of water was prepared. Sodium borohydride (50 mg.) was added and the solution was stirred at room temperature for one-half hour. The mixture was then poured into 0.1 N hydrochloric acid and extracted with ethyl acetate. Evaporation of the ethyl acetate left a pale yellow oil which was shown by thin layer chromatography to contain starting material plus a more polar product. The reaction was repeated using an additional 50 mg. of sodium borohydride and stirring for 24 hours. The reaction mixture was poured into 0.1 N hydrochloric acid and extracted into ethyl acetate. The ethyl acetate solution was dried over magnesium sulfate and the solvent removed in vacuo to leave an oil. Treatment of the oil with ether gave 650 mg. of the expected thiazolidine.

EXAMPLE 6

A solution of 1.5 g. of compound IV (R=phenoxymethyl) in 250 ml. of tetrahydrofuran containing a few drops of water was stirred with freshly prepared aluminum amalgam. Thin-layer chromatography showed no starting material after 2½ hours. This mixture was filtered through a layer of filter cel and magnesium sulfate and the filtrate evaporated. The residue was shaken with ether and the ether evaporated. The residue was then flushed several times with ether. Ten ml. of ether was added and crystals separated and were removed by filtration. The product (546 mg.) was repeatedly washed with ether until no phenol was detected by thin-layer chromatography. The product was confirmed by NMR and elemental analysis to be compound V (R=methyl). Thus, the phenoxymethyl ether linkage was cleaved by the reduction.

EXAMPLE 7

A solution of 14.56 g. of compound X(R=methyl; R''=p-methoxybenzyl) in 400 ml. of dry tetrahydrofuran was cooled in ice-water and phosgene was bubbled through the solution for 1¾ hours, after which time thin-layer chromatography showed no starting material remaining. The solution was evaporated in vacuo and the product crystallized from ether to give 7.5 g. of buff-colored crystals. Removal of solvent from the mother liquors in vacuo gave a further crop of 5.1 g. of white crystals. NMR showed both to be the chlorocarbonylthiazolidine XI (R=methyl; R'=chlorocarbonyl; R''=p-methoxybenzyl).

EXAMPLE 8

A solution of 3.86 g. of the chlorocarbonylthiazolidine prepared in Example 7 in 200 ml. of t-butanol was stirred with 12 g. of calcium carbonate for 3 days at 90° C. The solution was filtered and the solid washed with benzene. The filtrate was evaporated in vacuo, the residue taken up in ether, and chromatographed over silica gel using a 1:1 mixture of ether and Skellysolve C as the eluting solvent. The product (1.5 g.) was obtained as a colorless oil which was shown by elemental analysis, mass spectrometry, and NMR to be the t-butoxycarbonylthiazolidine XI (R=methyl; R'=t-butoxycarbonyl; R''=p-methoxybenzyl).

EXAMPLE 9

A solution of 7 g. of phenoxyacetylthiazolidine XI (R=methyl; R'=phenoxyacetyl; R''=p-methoxybenzyl) in 400 ml. of methanol was cooled to −78° C. and ozone was bubbled through the solution until a light blue color persisted. A crystalline product separated and was removed by filtration. The crystals were washed with cold sodium metabisulfite solution, water, then methanol. The crystalline product (2.09 g.) melted at 110° C. and was shown by NMR to be the desired imide VI (R=methyl; R'=phenoxyacetyl; R''=p-methoxybenzyl).

EXAMPLE 10

A solution of 470 mg. of the product from Example 9 in 50 ml. of methanol was heated under reflux for 2½ hours when thin-layer chromatography indicated no starting material remained. The solvent was removed in vacuo, the residue was dissolved in ethyl acetate, the solution washed well with water, dried, and the ethyl acetate removed in vacuo to give a colorless oil which was purified by preparative thin-layer chromatography to give 192 mg. of the thiazolidine azetidinone I (R=methyl; R'=phenoxyacetyl), m.p. 135°–137° C. The structure was confirmed by elemental analysis, mass spectroscopy, and NMR.

EXAMPLE 11

A solution of 4.64 g. of the imide IX (R=phenoxymethyl; R''=trichloroethyl) in 300 ml. of methanol containing 100 mg. of sodium methoxide was heated under reflux for 1 hour. The solution was concentrated to one-half its volume and cooled. The crystals were removed by filtration and the filtrate concentrated to 70 ml. and cooled further. A second crop of crystals was obtained and removed by filtration. There was obtained 2.04 g. of crystalline product, m.p. 157°–158° C, shown by NMR to be the azetidinone IV (R=phenoxymethyl).

EXAMPLE 12

A solution of 800 mg. of compound II (R=α,α-dimethylphenoxymethyl and R''=methyl) and 10 mg. of sodium methoxide in 50 ml. of methanol was cooled in a dry ice-acetone bath. Ozone was bubbled into the cold solution until a faint blue color was obtained. The excess ozone was purged with oxygen and the resulting solution was heated under reflux for 30 minutes. The methanol was removed in vacuo and the syrupy residue was dissolved in ethyl acetate. The ethyl acetate solution was washed with water, dried over anhydrous magnesium sulfate, filtered, and evaporated in vacuo. The residue, a thick syrup which failed to crystallize, weighed 501 mg. NMR showed the product to be the expected compound IV (R=α,α-dimethylphenoxymethyl).

EXAMPLE 13

The product from Example 12 (500 mg.) was dissolved in 100 ml. of tetrahydrofuran containing a few drops of water. Freshly prepared aluminum amalgam was added to the solution with stirring at room temperature to effect reduction of the starting material. The reaction was followed by the use of thin layer chromatography. After all the starting material was reduced, the thick, grey suspension was filtered through filter cel. The clear filtrate was evaporated in vacuo. There was obtained 300 mg. of white crystals which were washed with ether and dried; m.p. 150° C. The product was shown by NMR to be 3-isopropyl-4-thia-7-oxo-2,6-diazabicyclo[3.2.0]heptane (V, R=isopropyl).

It is also possible to start with a β,γ-unsaturated thiazoline azetidinone such as compound VII and carry out the reduction to the thiazolidine and acylation of the thiazolidine nitrogen before treating with a base to isomerize to the α,β-unsaturated isomer. Such a variation in the order of steps is still within the spirit of my invention. The product obtained from such an order of steps would be a thiazolidine azetidinone having the formula

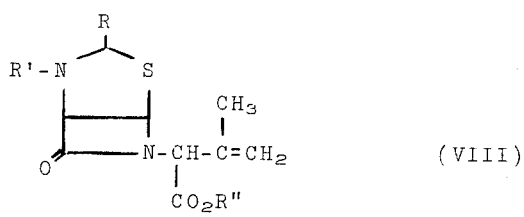

wherein R, R', and R'' are as defined above. The preparations of such compounds is illustrated by the following examples. Compounds of formula VIII are converted to compounds of formula I by ozonolysis and solvolysis.

EXAMPLE 14

A solution of 10 g. of the β,γ-unsaturated isomer of compound II (R=phenoxymethyl, R''=p-methoxybenzyl) in 800 ml. of 1:1 ether-tetrahydrofuran containing aluminum amalgam made from 12 g. of aluminum was stirred at 0° C. for 2½ hours. Thin layer chromatography showed no starting material. The solution was filtered, the precipitate washed with ethyl acetate, the combined filtrate and washings washed well with water, dried over magnesium sulfate, and the solvent removed in vacuo to give a colorless oil. Upon the addition of ether and standing 5.71 g. of crystalline thiazolidine separated. Evaporation of the ether gave 3.74 g. of another oil. This oil was separated into neutral and acidic fractions by extraction with a 1 N sodium hydroxide solution. The neutral oil gave a further 320 mg. of the crystalline thiazolidine. Elemental and spectral analysis showed the product to have structure VIII (R=methyl, R'=hydrogen, R''=p-methoxybenzyl).

Analysis: Calculated for $C_{18}H_{22}N_2O_4S$: C, 59.66; H, 6.12; N, 7.73.
Found: C, 59.66; H, 6.34; N, 7.62.

It will be noted that the aluminum amalgam reduction resulted in cleavage of the phenoxymethyl group with loss of phenol. This cleavage was not encountered in sodium borohydride reductions.

EXAMPLE 15

A mixture of 114 mg. of the product from Example 12, 500 mg. of sodium bicarbonate, and 12 mg. of phenoxyacetyl chloride in 25 ml. of ether was stirred at room temperature for 16 hours. The mixture was filtered and the solid washed with ether. The filtrate and washings were combined, washed with sodium bicarbonate solution, dried, and evaporated in vacuo to give the thiazolidine VIII (R=methyl, R'=phenoxyacetyl, R''=p-methoxybenzyl) as a colorless oil.

EXAMPLE 16

A mixture of 2.34 g. of the trichloroethyl ester corresponding to the p-methoxybenzyl ester starting material of Example 12, aluminum amalgam from 1.6 g. of aluminum, 300 ml. of 1:1 tetrahydrofuran-ether, and 2 ml. of water was stirred at room temperature for 3 hours. The mixture was filtered and the solid washed with ether. The filtrate and washings were combined, washed with sodium hydroxide solution, dried over magnesium sulfate, and evaporated in vacuo to give 396 mg. of the thiazolidine VIII (R=methyl, R'=hydrogen, R''=trichloroethyl).

I claim:

1. A method for the preparation of a thiazolidine azetidinone having the formula

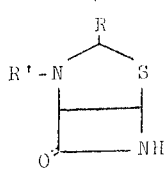

from a thiazoline azetidinone having the formula

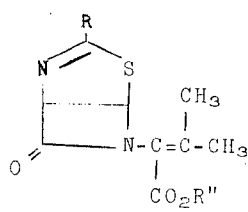

wherein R is hydrogen;
  methoxy;
  carboethoxy;
  $C_1$–$C_8$ alkyl, optionally substituted with hydroxy, mercapto, $C_1$–$C_3$ alkoxy, $C_1$–$C_3$ alkylthio, or cyano;
  $C_2$–$C_8$ alkenyl, optionally substituted with hydroxy, mercapto, $C_1$–$C_3$ alkoxy, $C_1$–$C_3$ alkylthio, or cyano;
  $C_3$–$C_8$ cycloalkyl, optionally substituted with hydroxy, mercapto, $C_1$–$C_3$ alkoxy, $C_1$–$C_3$ alkylthio, or cyano;

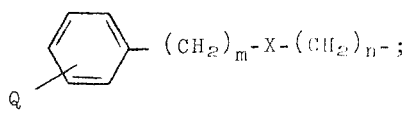

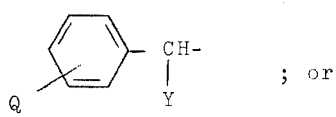

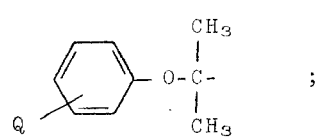

Q is hydrogen, hydroxy, mercapto, chloro, bromo, $C_1$–$C_3$ alkyl, $C_1$–$C_3$ alkoxy, $C_1$–$C_3$ alkylthio, nitro or cyano;
X is oxygen, sulfur, or a carbon to carbon bond;
Y is hydroxy, mercapto, or amino;
$m$ is an integer of 0 to 2;
$n$ is an integer of 1 to 2;
R' is hydrogen,

trimethylsilyl, trichloroethoxycarbonyl, t-butoxycarbonyl, or benzyloxycarbonyl; and
R'' is $C_1$–$C_6$ alkyl, $C_4$–$C_6$ t-alkyl, $C_5$–$C_8$ t-alkenyl, $C_5$–$C_8$ t-alkynyl, benzyl, benzhydryl, trityl, p-nitrobenzyl, p-methoxybenzyl, trimethylsilyl, phthalimidomethyl, succinimidomethyl, or trichloroethyl;

which comprises the steps of

A. treating with ozone at −80° to −20°C. to convert the side-chain double bond to a carbonyl group, thereby forming an imide;
B. after the ozonolysis, treating with a $C_1$–$C_3$ alkanol at 0° to +80° C. to hydrolyze the imide;
C. treating with aluminum amalgam or sodium borohydride at 0° to 50° C. to reduce the double bond of the thiazoline ring; and
D. after reduction of the double bond, optionally treating with an agent which will replace the hydrogen attached to the nitrogen of the thiazolidine ring with

trimethylsilyl, trichloroethoxycarbonyl, t-butoxycarbonyl, or benzyloxycarbonyl.

2. A thiazolidine azetidinone having the formula

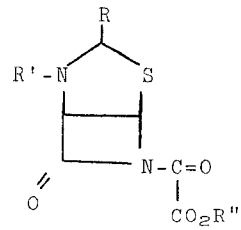

wherein R is hydrogen;
  methoxy;
  carboethoxy;
  $C_1$–$C_8$ alkyl, optionally substituted with hydroxy, mercapto, $C_1$–$C_3$ alkoxy, $C_1$–$C_3$ alkylthio, or cyano;
  $C_2$–$C_8$ alkenyl, optionally substituted with hydroxy, mercapto, $C_1$–$C_3$ alkoxy, $C_1$–$C_3$ alkylthio, or cyano;
  $C_3$–$C_8$ cycloalkyl, optionally substituted with hydroxy, mercapto, $C_1$–$C_3$ alkoxy, $C_1$–$C_3$ alkylthio, or cyano;

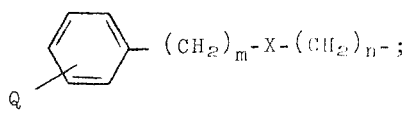

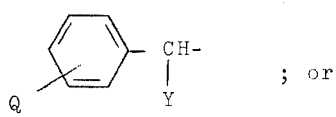

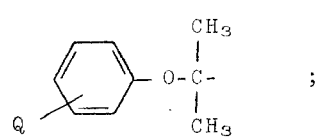

Q is hydrogen, hydroxy, mercapto, chloro, bromo, $C_1$–$C_3$ alkyl, $C_1$–$C_3$ alkoxy, $C_1$–$C_3$ alkylthio, nitro, or cyano;
X is oxygen, sulfur, or a carbon to carbon bond;
Y is hydroxy, mercapto, or amino;

$m$ is an integer of 0 to 2;
$n$ is an integer of 1 to 2;
R' is hydrogen,

trimethylsilyl, trichloroethoxycarbonyl, t-butoxycarbonyl, or benzyloxycarbonyl; and R'' is $C_1$–$C_6$ alkyl, $C_4$–$C_6$ t-alkyl, $C_5$–$C_8$ t-alkenyl, $C_5$–$C_8$ t-alkynyl, benzyl, benzhydryl, trityl, p-nitrobenzyl, p-methoxybenzyl, trimethylsilyl, phthalimidomethyl, succinimidomethyl, or trichloroethyl.

3. A thiazolidine azetidinone having the formula

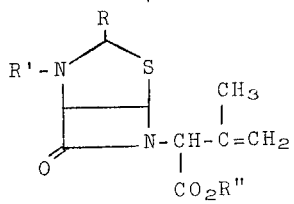

wherein R is hydrogen;
methoxy;
carboethoxy;
$C_1$–$C_8$ alkyl, optionally substituted with hydroxy, mercapto, $C_1$–$C_3$ alkoxy, $C_1$–$C_3$ alkylthio, or cyano;
$C_2$–$C_8$ alkenyl, optionally substituted with hydroxy, mercapto, $C_1$–$C_3$ alkoxy, $C_1$–$C_3$ alkylthio, or cyano;
$C_3$–$C_8$ cycloalkyl, optionally substituted with hydroxy, mercapto, $C_1$–$C_3$ alkoxy, $C_1$–$C_3$ alkylthio, or cyano;

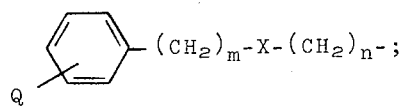

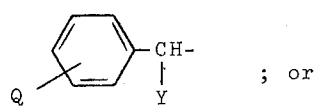

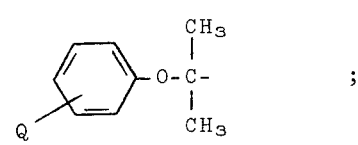

Q is hydrogen, hydroxy, mercapto, chloro, bromo, $C_1$–$C_3$ alkyl, $C_1$–$C_3$ alkoxy, $C_1$–$C_3$ alkylthio, nitro or cyano;
X is oxygen, sulfur, or a carbon to carbon bond;
Y is hydroxy, mercapto, or amino;
$m$ is an integer of 0 to 2;
$n$ is an integer of 1 to 2;
R' is hydrogen,

trimethylsilyl, trichloroethoxycarbonyl, t-butoxycarbonyl, or benzyloxycarbonyl; and R'' is $C_1$–$C_6$ alkyl, $C_4$–$C_6$ t-alkyl, $C_5$–$C_8$ t-alkenyl, $C_5$–$C_8$ t-alkynyl, benzyl, benzhydryl, trityl, p-nitrobenzyl, p-methoxybenzyl, trimethylsilyl, phthalimidomethyl, succinimidomethyl, or trichloroethyl.

4. A thiazoline azetidinone having the formula

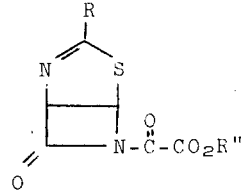

wherein R is hydrogen;
methoxy;
carboethoxy;
$C_1$–$C_8$ alkyl, optionally substituted with hydroxy, mercapto, $C_1$–$C_3$ alkoxy, $C_1$–$C_3$ alkylthio, or cyano;
$C_2$–$C_8$ alkenyl, optionally substituted with hydroxy, mercapto, $C_1$–$C_3$ alkoxy, $C_1$–$C_3$ alkylthio, or cyano;
$C_3$–$C_8$ cycloalkyl, optionally substituted with hydroxy, mercapto, $C_1$–$C_3$ alkoxy, $C_1$–$C_3$ alkylthio, or cyano;

$$\underset{Q}{\bigcirc}-(CH_2)_m-X-(CH_2)_n-\ ;$$

$$\underset{Q}{\bigcirc}-\underset{Y}{\overset{\ }{CH}}-\ ;\ \text{or}$$

$$\underset{Q}{\bigcirc}-O-\underset{CH_3}{\overset{CH_3}{\underset{|}{C}}}-\ ;$$

Q is hydrogen, hydroxy, mercapto, chloro, bromo, $C_1$–$C_3$ alkyl, $C_1$–$C_3$ alkoxy, $C_1$–$C_3$ alkylthio, nitro, or cyano;
X is oxygen, sulfur, or a carbon to carbon bond;
Y is hydroxy, mercapto, or amino;
$m$ is an integer of 0 to 2;
$n$ is an integer of 1 to 2; and
R'' is $C_1$–$C_6$ alkyl, $C_4$–$C_6$ t-alkyl, $C_5$–$C_8$ t-alkenyl, $C_5$–$C_8$ t-alkynyl, benzyl, benzhydryl, trityl, p-nitrobenzyl, p-methoxybenzyl, trimethylsilyl, phthalimidomethyl, succinimidomethyl, or trichloroethyl.

5. A thiazolidine azetidinone having the formula $$\underset{O}{\overset{R'-N\diagdown\ \diagup S\diagdown}{\square}}\underset{\ }{\overset{R}{\diagdown\ }}\underset{\ }{\underset{CO_2R''}{N-C=C-CH_3}}\overset{CH_3}{\ }$$

wherein R is hydrogen;
methoxy;

carboethoxy;

$C_1$-$C_8$ alkyl, optionally substituted with hydroxy, mercapto, $C_1$-$C_3$ alkoxy, $C_1$-$C_3$ alkylthio, or cyano;

$C_2$-$C_8$ alkenyl, optionally substituted with hydroxy, mercapto, $C_1$-$C_3$ alkoxy, $C_1$-$C_3$ alkylthio, or cyano;

$C_3$-$C_8$ cycloalkyl, optionally substituted with hydroxy, mercapto, $C_1$-$C_3$ alkoxy, $C_1$-$C_3$ alkylthio, or cyano;

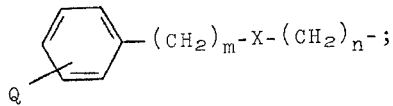

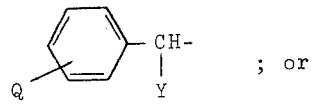 ; or

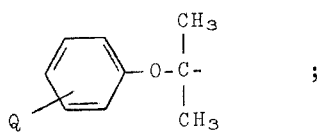 ;

Q is hydrogen, hydroxy, mercapto, chloro, bromo, $C_1$-$C_3$ alkyl, $C_1$-$C_3$ alkoxy, $C_1$-$C_3$ alkylthio, nitro, or cyano;

X is oxygen, sulfur, or a carbon to carbon bond;

Y is hydroxy, mercapto, or amino;

$m$ is an integer of 0 to 2;

$n$ is an integer of 1 to 2;

R' is hydrogen,

trimethylsilyl, trichloroethoxycarbonyl, t-butoxycarbonyl, or benzyloxycarbonyl; and R'' is $C_1$-$C_6$ alkyl, $C_4$-$C_6$ t-alkyl, $C_5$-$C_8$ t-alkenyl, $C_5$-$C_8$ t-alkynyl, benzyl, benzhydryl, trityl, p-nitrobenzyl, p-methoxybenzyl, trimethylsilyl, phthalimidomethyl, succinimidomethyl, or trichloroethyl.

* * * * *